United States Patent [19]
Urabe

[11] Patent Number: 5,185,710
[45] Date of Patent: Feb. 9, 1993

[54] QUATERNARY-LEVEL WAVEFORM GENERATOR

[75] Inventor: Kenzo Urabe, Sendai, Japan

[73] Assignee: Kokusai Electric Co., Ltd., Tokyo, Japan

[21] Appl. No.: 813,807

[22] Filed: Dec. 26, 1991

[51] Int. Cl.⁵ .................................. G06F 1/02
[52] U.S. Cl. .............................. 364/718; 328/14
[58] Field of Search ...................... 364/718-722; 328/14

[56] References Cited

U.S. PATENT DOCUMENTS

| | | | |
|---|---|---|---|
| 4,338,674 | 7/1982 | Hamada | 364/718 |
| 4,809,577 | 3/1989 | Fujita | 84/604 |
| 4,878,194 | 10/1989 | Nakatsugawa et al. | 364/718 |
| 4,992,743 | 2/1991 | Sheffer | 328/14 |

Primary Examiner—Tan V. Mai
Attorney, Agent, or Firm—Emmanuel J. Lobato; Robert E. Burns

[57] ABSTRACT

A quaternary-level waveform generator in which a modulation wave prior to a band restriction (a quaternary-level square wave sequence) is separated into two binary-level square wave sequences and as waveform components prestored corresponding waveform component outputs after a predetermined band restriction are read out of a waveform component generating read-only memory and added to generate a desired quaternary-level waveform shaped by the band-restriction.

2 Claims, 2 Drawing Sheets

QUATERNARY-LEVEL WAVEFORM GENERATOR

BACKGROUND OF THE INVENTION

The present invention relates to improvement in or relating to a band-restricted, quaternary-level waveform generator for deriving a band-limited, shaped waveform from a sequence of quaternary-level square waves with a fixed pitch between any two adjacent levels out of four, which is used in a 16 quardrature amplitude modulation (QAM), four-level frequency modulation (FM), or similar digital modulation schemes.

For deriving a shaped waveform of four levels from a quaternary-level square wave sequence by subjecting it to a predetermined band restriction, there have heretofore been used an analog or digital filtering method which shapes the quaternary-level square wave signal by a band restriction analog or digital low-pass filter, and a waveform table ROM method according to which, with respect to all combinations of k symbols (k being a constraint length due to intersymbol interference caused by predetermined band restriction), the waveform of the k-th symbol of the above-mentioned shaped waveform after the band restriction is computed on off-line basis and prestored in a ROM (Read Only Memory) as a waveform table and is then read out therefrom and subjected to a D/A conversion With the analog filtering method, however, the low-pass filter for band restriction use is usually high-order, and hence is large in the scale of its circuit structure, and when the low-pass filter is formed by an analog element, it calls for compensation for an environmental change and timing aging and fine adjustment and is not suitable for fabrication as an IC. Thus, the analog low-pass filter has difficulties in miniaturization, economization and stabilization.

If the low-pass filter is implemented by a digital signal processing device through utilization of the A/D and D/A conversion techniques, its stabilization can be achieved but its circuit scale and power consumption will be large.

On the other hand, the digital processing method utilizing the waveform table ROM is generally excellent in terms of miniaturization, economization and stabilization, but letting the number of samples of the D/A conversion per symbol be represented by S, the capacity of the ROM (the number of memorized words for D/A conversion) is $S \cdot 4^k$ words. This value is $2^k$ times larger than the $S \cdot 2^k$-word capacity which is needed in a modulation scheme, such as QPSK (quadrature phase shift keying) using a shaped waveform of a binary-level square wave sequence is generated from the waveform table ROM with the same sample number S. Since the capacity becomes enormous with an increase in k, this method is impractical when k becomes comparably large.

SUMMARY OF THE INVENTION

An object of the present invention is to provide a method for generating a quaternary-level waveform shaped by band-restriction which generates, through digital processing, a band-restricted quaternary-level waveform necessary for the 16 QAM or four-level FM and which obviates the problems of miniaturization, economization and stabilization encountered in the conventional method utilizing analog or digital filtering and overcomes the defect of the exponential increase of the memory capacity in the conventional method utilizing waveform table ROM.

To attain the above object of the present invention, the present invention is based on a method in which a modulation wave prior to the band restriction (a quaternary-level square wave sequence) is separated into two binary-level square wave sequences and as waveform components prestored corresponding waveform component outputs after a predetermined band restriction are read out of a waveform component generating ROM added to generate a desired quaternary-level waveform shaped by the band-restriction.

BRIEF DESCRIPTION OF THE DRAWINGS

The present invention will be described in detail below with reference to accompanying drawings, in which.

DETAILED DESCRIPTION

Figure 1A:
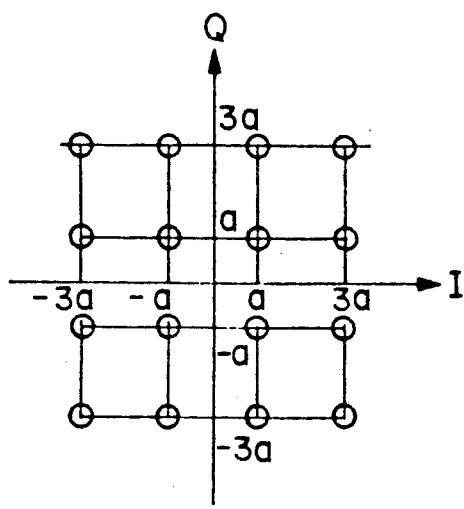
FIG. 1A is an explanatory diagram showing a constellation of modulation symbols in 16 QAM.

FIG. 1A is an explanatory diagram showing a modulation symbol constration in a 16 QAM of one of modulation schemes to which the present invention is applied. In FIG. 1A the abscissa and the ordinate represent an in-phase component (I) and a quadrature component (Q), respectively, which constitutes two quadrature modulation waveforms, and as shown, intersections (16 points) of vertical and horizontal straight lines are modulation symbols which assume quaternary-levels of $\pm 3a$, and $\pm a$ (where $a > 0$) on the respective axes. The levels of adjacent modulation symbols on each axis have a constant pitch $2a$, in the case of FIG. 1A.

Figure 1B:
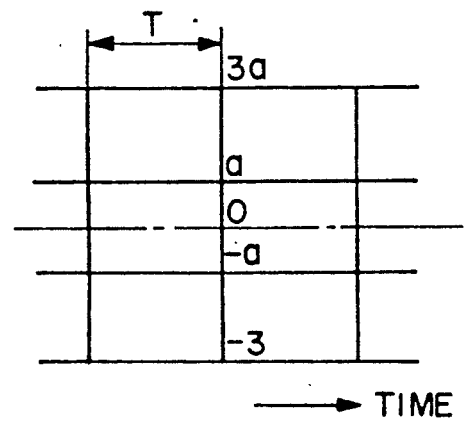
FIG. 1B is an explanatory diagram showing a quaternary-level square wave sequence prior to band restriction.

FIG. 1B is an explanatory diagram showing a sequence of quaternary-level square waves prior to its band restriction. The above-mentioned time-varying component I or Q prior to the band restriction becomes a sequence of quaternary-level ($\pm 3a$, $\pm a$) square waves varying with a period of one symbol time length T as shown in FIG. 1B. In a four-level FM system of another modulation system to which the present invention is applied, the base band signal prior to the band restriction becomes the same quaternary-level square wave sequence as that depicted in FIG. 1B, and the absolute value $3a$ of the maximum level corresponds to the modulation signal level which defines an FM modulation index.

Figure 2:
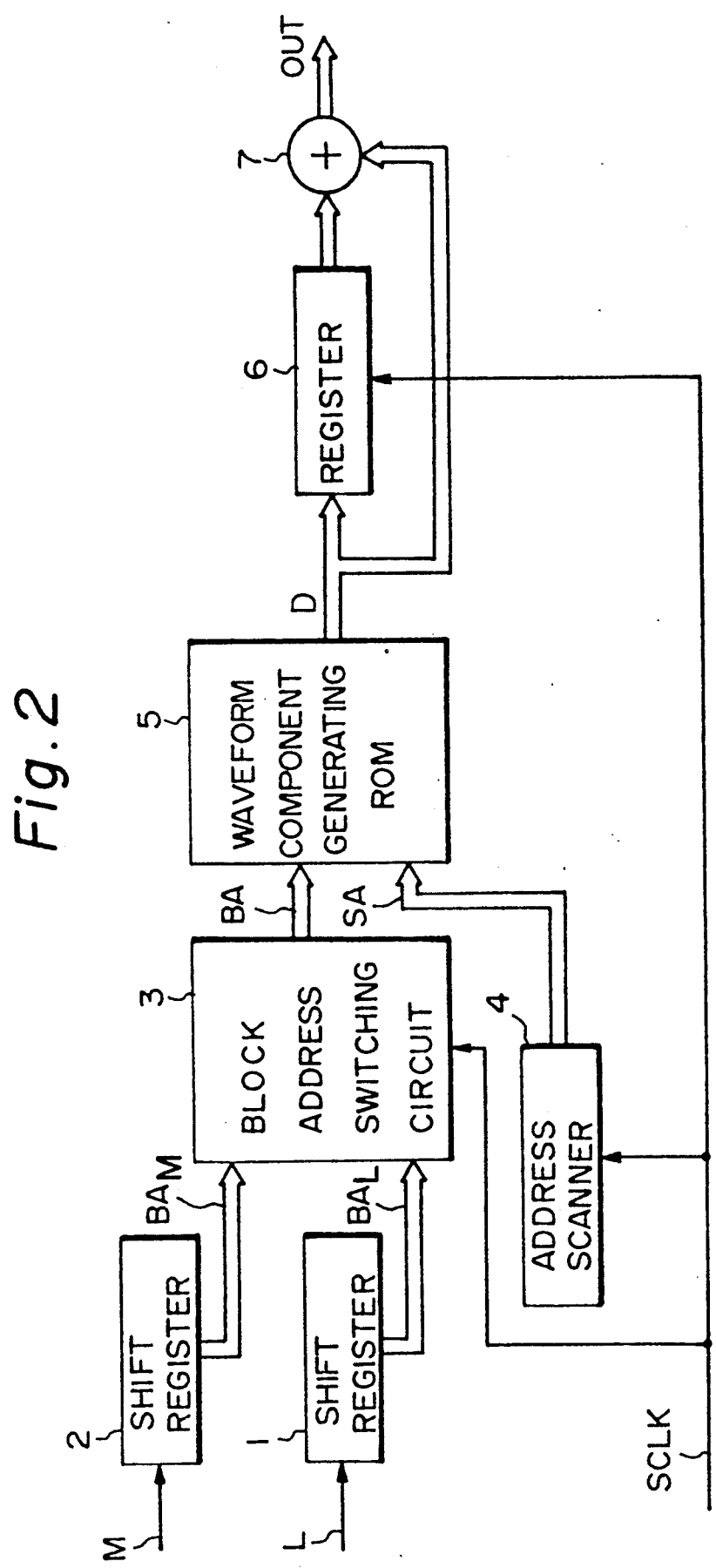
FIG. 2 is a block diagram illustrating an embodiment of the present invention.

FIG. 2 is a block diagram illustrating an embodiment of the present invention. Reference numerals 1 and 2 indicate shift registers into which LSBs (least significant bits) L and MSBs (most significant bits) M of binary coded quaternary number representing the level of each symbol of the quaternary-level square wave prior to band restriction, are input, respectively, while being sequentially shifted in accordance with the symbol timing and from which are obtained parallel outputs $BA_L$ and $BA_M$ each of which is a binary sequence of k bits (where k is the constraint length due to intersymbol interference caused by band restriction).

Reference numeral 3 denotes a block address switching circuit which receives the parallel outputs $BA_L$ and $BA_M$, each k-bit binary sequence, and switches them in accordance with the polarity of an external sampling clock signal SCLK to supply $BA_L$ and $BA_M$ alternately as the k-bit binary sequence output BA, to a block address of a waveform component generating ROM described later.

Reference numeral 4 identifies and address scanner generator which consists of a counter that receives the sample clock signal SCKL and counts it to generate a scanning address SA with one symbol period as one cycle.

Reference numeral 5 denotes a waveform component generating ROM for prestoring an arbitrary one (hereinafter referred to as a component waveform output) of the two waveform component during one symbol period after band restriction. The ROM receives the block address BA and the scanning address SA from the block address switching circuit 3 and the address scanner generator 4 and outputs stored data of a memory block specified by the block address BA, that is, the waveform component output D, in a time series specified by the scanning address SA.

Now, the waveform component output D is defined to be the waveform of a k-th symbol in a band-restricted binary level square wave sequence of k symbols obtained by mapping each bit (MSL,LSB) of the block address BA composed of the k-bit binary sequence onto positive and negative binary-level square wave with the same amplitude. Accordingly, in the memory block specified by the block address BA of the waveform component generating ROM the waveform of the k-th symbol of the band-restricted binary-level waveform computed on off line basis as the waveform component output D is prestored in the time series specified by the scan address SA.

Reference numeral 6 denotes a register in which the waveform component output D read out of the waveform component generating ROM 5 is temporarily stored in accordance with the rise-up (or fall) timing of the sampling clock signal SCLK.

Reference numeral 7 denotes an adder connected to the register and the waveform component generating ROM 5. Letting $D_L$ $D_M$ represent the waveform component outputs D read out of the waveform component generating ROM 5 when k-bit binary sequences $BA_L$ and $BA_M$ appear respectively in the block address BA by the switching operation of the block address switching circuit 3, the adder performs an addition $2D_M+D_L$ or $D_M+\frac{1}{2}D_L$ and provides the added output as a quaternary-level waveform OUT to the outside.

The processing for obtaining $2D_M$ or $\frac{1}{2}D_L$ is equivalent to an operation of one-bit shift toward the most significant bit or the least significant bit respectively because of characteristics of a binary number, and hence can easily be implemented simply by connection route to the inputs of the adder 7, without the necessity of providing any particular means therefor. Further, the register 6 enables the above-mentioned $D_L$ (or $\frac{1}{2}D_L$) and $2D_M$ (or $D_M$) to be simultaneously applied to the two inputs of the adder.

Figure 3:
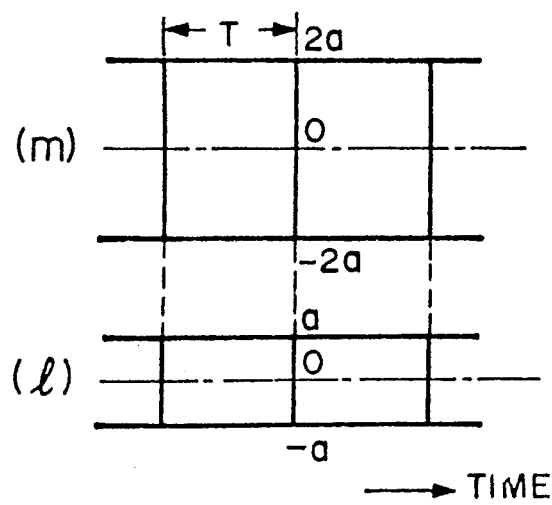
FIG. 3 is an explanatory diagram showing the separation of the quaternary-level square wave sequence of FIG. 1B into two binary square wave sequences.

With reference to FIG. 3, the operation of the FIG. 2 embodiment according to the present invention will be described.

FIG. 3 is an explanatory diagram showing two binary-level square wave sequences into which the quaternary-level square wave sequence of FIG. 1B was separated. That is, the square wave sequence of four levels $\pm 3a$ and $\pm a$ is separated into two binary-level square wave sequences (l) and (m) each of which has two levels $\pm a$ and $\pm 2a$, respectively, and bear the ratio of 1:2 and the sum of the both square wave sequences is equal to the quaternary-level square wave sequence depicted in FIG. 1B. The binary-level square wave sequences (l) and (m) are obtained by mapping LSBs (L in FIG. 2) and MSBSs(M in FIG. 2) of binary coded quaternary number assigned to the quaternary-levels in FIG. 1B, onto two binary sequences of two levels $\pm a$ and $\pm 2a$, respectively. This is evident from the following fact: Let l and m represent variables obtained by converting binary values (0, 1) of the least significant bit L and the most significant bit M onto positive and negative integers $(-1, +1)$, respectively, the quaternary levels, $q(=\pm 3a, \pm a)$, can be expressed by the following equation:

$$q = 2a \cdot m + a \cdot l \qquad (1)$$

and the first and second terms on the right side of Eq.(1) correspond to the waveform values of square wave sequences (m) and (l) in FIG. 3 respectively.

As will be appreciated from the above, the waveform generated by adding in the ratio of 1:2 the k-symbol binary-level square wave sequences specified as the block address BA of the wave component generating ROM by the k-bit binary sequences $BA_L$ and $BA_M$ in FIG. 2 respectively, is equal to k-symbol period of the quaternary-level square wave sequence prior to band restriction, shown in FIG. 1B. Taking it to account that the band restriction processing is linear operation. It is evident that the band-limited quaternary-level waveform can be obtained by adding, in the ratio of 1:2, the wave component outputs $D_L$ and $D_M$ after the band restriction read out of the waveform component generating ROM 5, using the binary sequences $BA_L$ and $BA_M$ as the block address BA, and it is seen that the present invention performs the above-mentioned processing by use of the block address switching circuit 3 and the register 6 on a time-shared basis. Incidentally, the analog signal of the quaternary-level shaped waveform can be obtained by converting the output OUT of the adder 7 into an analog signal through use of a D/A converter (not shown) after once storing it in an external register (not shown). In the case of obtaining quaternary-level waveforms of the I and Q components in parallel as in the generation of the 16 QAM modulation waveform, the constitution of the present invention can be employed on a dual time-shared basis, without increasing the memory capacity, by additionally providing a multiplexer for switching between inputs of the quaternary-level waveforms of the I and Q components and a demultiplexer for separating the shaped waveforms of the I and Q components from the output of the adder 7 and storing them.

Letting the number of samples of the shaped waveform per symbol be represented by S, the capacity of the memory (the waveform component generating ROM 5 in FIG. 2) which is used in the band-restricted quaternary-level waveform generator of the present invention is $S \cdot 2^k$ words, which is equal to the number of samples in the case of the QPSK modulation waveform generator, because the input sequence which determines one symbol is a k-bit binary sequence. This value is $\frac{1}{2^k}$ times smaller than the $S \cdot 4^k$ words needed in the prior art method of obtaining the shaped waveform directly from the k-symbol period of the quaternary-level square wave sequence depicted in FIG. 1A. Thus, the present invention affords marked reduction of the memory capacity.

As described above in detail, according to the present invention, the generation of the band-restricted quaternary-level waveform can be performed by producing and combining two similar waveform components through digital processing, and hence is free from the problems of miniaturization, economization and stabilization encountered in the conventional analog filtering. Moreover, the system of the present invention avoids an exponential increase of the memory capacity which constitutes an obstacle in the conventional method utilizing waveform table ROM, and hence can easily be implemented.

What is claimed is:

1. A quaternary-level waveform generator for deriving a quaternary-level waveform, shaped by band-restriction as predetermined, from a sequence of quaternary-level square waves with a fixed pitch between any two adjacent levels out of four, comprising:

a circuit including a waveform component generating read-only memory wherein a waveform of a k-th symbol (k being a constraint length due to intersymbol interference caused by predetermined band-restriction) of an arbitrary k-symbol binary square wave sequence is computed as a waveform component out and is stored in a time series in a memory block of said waveform component generating read-only memory specified by a block address composed of k-bit binary sequence corresponding to said k-symbol binary square wave sequence;

said circuit including a block address switching circuit coupled to the read-only memory wherein k-bits binary sequences composed of most significant bits and least significant bits of a binary-coded quaternary number for representing the levels of respective symbols of said quaternary-level square wave sequence prior to band restriction are alternately switched on a time-shared basis and fed to the block address of said waveform component generating read-only memory; and an adder coupled to the read-only memory wherein two parallel outputs, obtained by switching two waveform component outputs alternately read out of said waveform component generating read-only memory on a time-shared basis, are added in the ratio of 2:1 generate said quaternary-level waveform shaped by band-restriction for output.

2. A quaternary-level waveform generator according to claim 1, in which said time series waveform component generating read-only memory has a memory capacity of $S \cdot 2^k$, where S the number of samples of the shaped waveform per symbol, and an input sequence for determining one symbol is a k-bit binary sequence.

* * * * *